Nov. 17, 1942.  A. R. NELSON  2,302,246
TRAILER DOLLY
Filed April 15, 1940
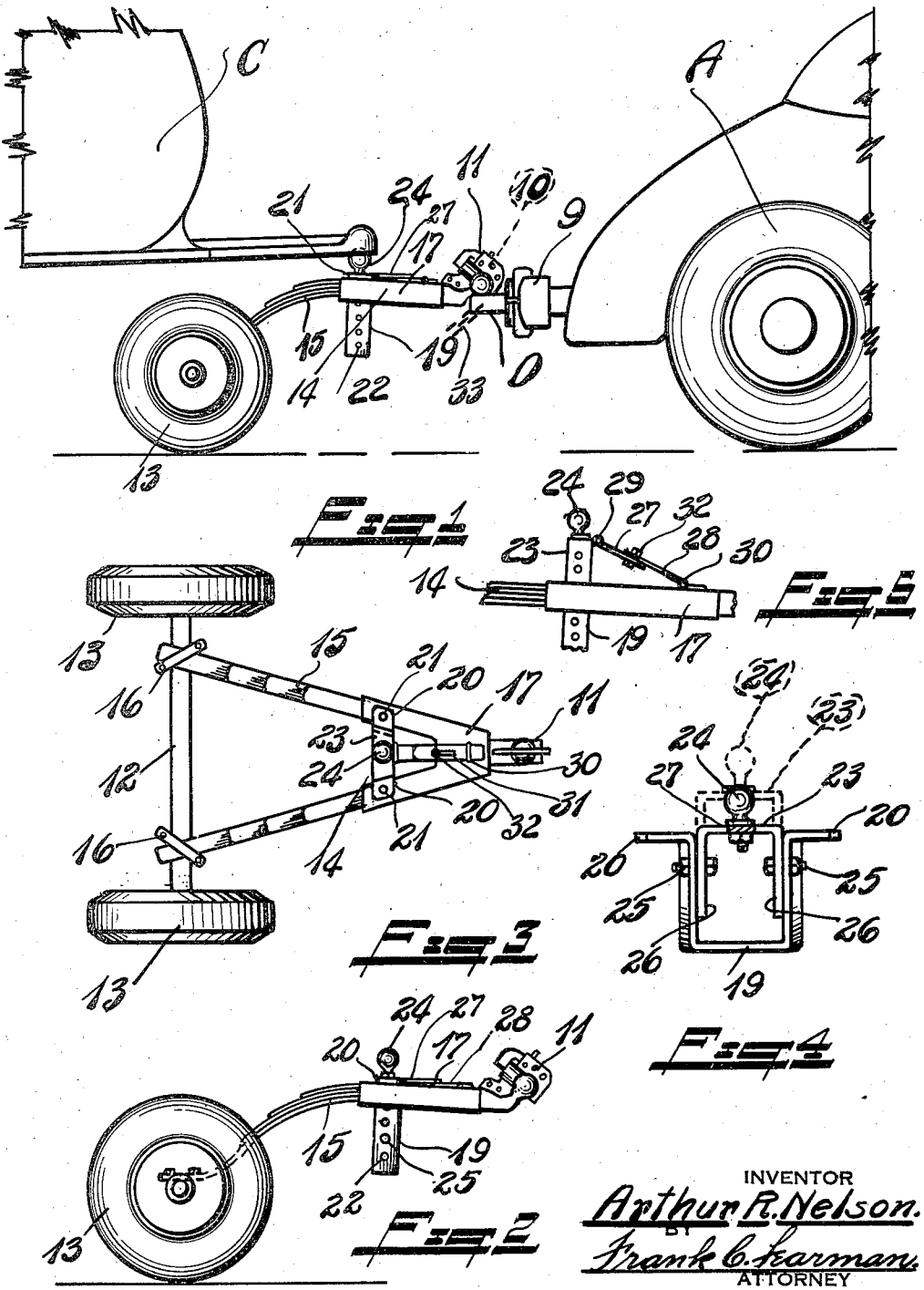
INVENTOR
Arthur R. Nelson.
BY Frank C. Karman
ATTORNEY Patented Nov. 17, 1942

2,302,246

UNITED STATES PATENT OFFICE 2,302,246

TRAILER DOLLY

Arthur R. Nelson, Bay City, Mich.

Application April 15, 1940, Serial No. 329,644

6 Claims. (Cl. 280—33.4)

This invention relates to means for coupling a trailer to a power vehicle, and more particularly to an intermediate truck or dolly which is interposed between the trailer and the power vehicle.

One of the prime objects of the invention is to design a wheeled truck including coupling mechanism of the ball and socket type, which truck is readily attachable to or detachable from a towing vehicle, and which supports in part or wholly the weight of the front end of the towed vehicle, thus relieving the towing vehicle of this additional and excessive load and the consequent strains caused by travel over rough and uneven roadways, as well as eliminating swaying of the towed vehicle when traveling at high speeds.

Another object of the invention is to design an intermediate wheeled truck adapted to be coupled to the towing vehicle, which truck forms the front wheels of the towed vehicle, and provide vertically adjustable means on said truck to facilitate attachment of the towed vehicle thereto.

A further object is to provide an intermediate wheeled truck having a flexible draft tongue to absorb all sharp impacts and tortional twists caused by travel over rough and uneven highways, or from quick starting and stopping.

A further object still is to provide a coupling attaching means which is adjustable on the intermediate truck, so that the trailer may be accurately balanced and held at the standard height for properly stabilizing the trailer, so that it may be towed at high speeds without sway, pitch, or heave.

A still further object is to design a quickly detachable intermediate truck arrangement which is relatively light in weight, so that it can be readily placed in and be carried by the towing vehicle, or the trailer when general conditions or circumstances make it advisable to connect the trailer direct to the power vehicle.

With the above and other objects in view, the present invention consists in the combination and arrangement of parts, hereinafter more fully described, illustrated in the accompanying drawing, and more particularly pointed out in the appended claims, it being understood that changes may be mad- in the form, size, proportion, and minor details of construction, without departing from the spirit, or sacrificing any of the advantages of the invention.

In the drawing:

Fig. 1 is a side elevational view showing one embodiment of my invention with a trailer tongue in position for connection to the intermediate truck or dolly, and the said dolly connected to a towing vehicle.

Fig. 2 is an enlarged, side, elevational view of the trailer dolly proper.

Fig. 3 is a detailed top plan view thereof.

Fig. 4 is an enlarged, detailed, end view illustrating the adjustable ball bolt frame, the broken lines illustrating the adjustment.

Fig. 5 is an enlarged detail side view illustrating the manner of bracing the ball bolt frame.

Referring now more particularly to the drawing in which I have shown one embodiment of my invention, the letter A indicates a conventional towing vehicle to which is coupled an intermediate truck B, and a towed vehicle such as a house trailer of the like C is coupled to the intermediate truck or dolly member B for supporting the front end of the towed vehicle.

To facilitate the attachment or the coupling of the intermediate truck B to the towing vehicle, I provide an attaching member D which can be secured to the bumper 9 of the towing vehicle, and a ball bolt 10 is mounted thereon in the usual manner, and to which the coupling 11 on the intermediate truck is universally connected.

The intermediate truck B comprises an axle member 12 carried on ground engaging wheels 13 as usual, and a draft tongue frame 14 is attached to said axle, said tongue comprising a pair of preshaped diverging leaf spring assemblies 15, the lower ends of which are securely anchored to the axle by welding or by means of U clamps 16, the upper outer ends being rigidly secured to a triangular-shaped end member 17, having a ball coupling member 11 mounted thereon; and I do not deem it necessary to show or describe this coupling member in detail, as it can be of any conventional design at present on the market.

A U-shaped stirrup member 19 spans the draft tongue 14 at a point spaced from the outer end thereof, the ends 20 of said stirrup being turned to engage the upper face of the legs of the member 17, and bolts 21 serve to secure this stirrup in position, suitable openings 22 being provided in the legs of the stirrup, and for a purpose to be hereinafter described.

An inverted U-shaped frame or member 23 is adjustably mounted on the stirrup 19, and a ball bolt 24 is rigidly mounted thereon, bolts 25 being provided in the depending legs 26 as shown, and are adapted to register with the openings 22, so that the frame and ball bolt may be adjusted vertically as desired in order that the trailer may be tilted at the proper angle for towing, which is of extreme importance, particularly when trailers are being towed at high speeds.

To prevent rocking of the ball bolt frame when it is in extended position such as shown in Fig. 5 of the drawing, I provided straps 27 and 28 respectively which are hinged as at 29 and 30 to the ball bolt frame 23 and the triangular member 17, the strap 28 being slotted as at 31 and accommodates a bolt 32 which is mounted in the strap 27 so that these straps may slide on each other when the frame 23 is adjusted.

As a safety measure and to comply with the law in some states, I provide chains 33, one end of each chain being attached to the member D, while the opposite end is attached to the trailer proper. The spring assemblies 15 provide the necessary resiliency to take up shocks and strains as well as all tortional twist and bending caused by travel over rough roads, thus making for smoother riding qualities, as well as materially increasing the life of the mechanism.

When for any reason it is advisable to connect the trailer directly to the power vehicle, it is merely necessary to remove the intermediate truck B, the trailer C can then be connected directly to the power vehicle, and the intermediate truck can then be placed in the trailer or power vehicle. This intermediate truck is light in weight so that it can be readily handled, and the coupling and uncoupling can be easily and quickly accomplished.

From the foregoing description, it will be obvious that I have perfected a very simple, practical, and convenient intermediate truck or dolly together with coupling mechanism for connection to a trailer and a power vehicle.

What I claim is:

1. An intermediate truck of the class described comprising an axle, ground engaging wheels supporting said axle, a draft tongue secured to said axle and comprising a pair of upwardly bowed converging spring members rigidly secured together at their outer ends and terminating in a universal coupling, and a vertically adjustable frame spanning said draft tongue at a point spaced rearwardly from said coupling, and a ball bolt mounted on said frame.

2. A trailer bogie comprising, a wheeled axle, upwardly arched multiple leaf springs disposed in rearwardly divergent relation to each other, means separately connecting the rear ends of said springs to said axle, a universal coupling joining the forward ends of said springs, and a vertically adjustable coupling supported between said springs rearwardly of the first mentioned coupling.

3. A trailer bogie comprising, a wheeled axle, upwardly arched multiple leaf springs disposed in rearwardly divergent relation to each other, means separately connecting the rear ends of said springs to said axle, a universal coupling joining the forward ends of said springs, a vertically adjustable coupling supported between said springs rearwardly of the first mentioned coupling, and a rigid yoke joining the springs and the first mentioned coupling.

4. A trailer bogie comprising, a wheeled axle, upwardly arched multiple leaf springs disposed in rearwardly divergent relation to each other, means connecting the rear ends of said springs to said axle, a universal coupling joining the forward ends of said springs, a vertically adjustable coupling supported between said springs rearwardly of the first mentioned coupling, a rigid yoke joining the springs and the first mentioned coupling, a substantially U-shaped member on the yoke for the last mentioned coupling, and a bracket carrying the latter and adjustably fitting the member.

5. A trailer bogie comprising, a wheeled axle, upwardly arched multiple leaf springs disposed in rearwardly divergent relation to each other, means connecting the rear ends of said springs to said axle, a universal coupling joining the forward ends of said springs, a vertically adjustable coupling supported between said springs rearwardly of the first mentioned coupling, a rigid yoke joining the springs and the first mentioned coupling, a substantially U-shaped member on the yoke for the last mentioned coupling, a bracket carrying the latter and adjustably fitting the member, and adjustable means for bracing the bracket when fitting the yoke.

6. A trailer bogie comprising, a wheeled axle, upwardly arched multiple leaf springs disposed in rearwardly divergent relation to each other, means connecting the rear ends of the springs to said axle; a universal coupling connecting the forward ends of the springs, a vertically adjustable coupling supported between said springs rearwardly of the first mentioned universal coupling, said springs and wheeled axle forming substantially an equilateral triangular-shaped frame.

ARTHUR R. NELSON.